(12) United States Patent
Hauke et al.

(10) Patent No.: US 11,836,031 B2
(45) Date of Patent: Dec. 5, 2023

(54) APPLICATION OVERRIDE OF POWER ESTIMATION MECHANISM

(71) Applicants: Advanced Micro Devices, Inc., Santa Clara, CA (US); ATI Technologies ULC, Markham (CA)

(72) Inventors: Jonathan David Hauke, Austin, TX (US); Adam Clark, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/094,283

(22) Filed: Nov. 10, 2020

(65) Prior Publication Data
US 2022/0147134 A1    May 12, 2022

(51) Int. Cl.
*G06F 1/00* (2006.01)
*G06F 1/3287* (2019.01)
*G06F 1/324* (2019.01)

(52) U.S. Cl.
CPC ............ *G06F 1/3287* (2013.01); *G06F 1/324* (2013.01)

(58) Field of Classification Search
None
See application file for complete search history.

(56) References Cited

U.S. PATENT DOCUMENTS

| | | | |
|---|---|---|---|
| 5,712,826 A | 1/1998 | Wong et al. | |
| 5,764,089 A | 6/1998 | Partovi et al. | |
| 5,917,355 A | 6/1999 | Klass | |
| 5,940,779 A | 8/1999 | Gaitonde et al. | |
| 6,278,308 B1 | 8/2001 | Partovi et al. | |
| 6,415,388 B1* | 7/2002 | Browning | G06F 1/324 |
| | | | 702/132 |
| 6,473,732 B1 | 10/2002 | Chen | |
| 6,564,328 B1 | 5/2003 | Grochowski et al. | |
| 6,597,620 B1 | 7/2003 | McMinn | |

(Continued)

OTHER PUBLICATIONS

Fischer et al., "A 90nm Variable-Frequency Clock System for a Power-Managed Itanium®-Family Processor", IEEE International Solid-State Circuits Conference, Aug. 2005, pp. 294-295 & 599, vol. 1, San Francisco, CA, ISSN: 0193-6530, ISBN: 0-7803-8904-2.

(Continued)

*Primary Examiner* — Nitin C Patel
(74) *Attorney, Agent, or Firm* — KOWERT HOOD MUNYON RANKIN AND GOETZEL PC; Rory D. Rankin

(57) ABSTRACT

Systems, apparatuses, and methods for performing a software override of a power estimation mechanism are disclosed. A computing system includes a plurality of tuned parameters for generating an estimate of power consumption. The tuned parameters are generated based on post-silicon characterization of the system. After deployment, the system executes a plurality of different applications. When launching a particular application, the system loads a corresponding set of override parameters which are used to replace the plurality of tuned parameters. The system generates an estimate of power consumption using the set of override parameters rather than the previously determined tuned parameters. Then while executing the particular application, the system makes adjustments to power and frequency values for the various system components based on the estimate of power consumption.

20 Claims, 8 Drawing Sheets

(56) References Cited

U.S. PATENT DOCUMENTS

| | | | |
|---|---|---|---|
| 6,611,435 | B2 | 8/2003 | Kumar et al. |
| 6,976,178 | B1 | 12/2005 | Kissell |
| 7,096,145 | B2 | 8/2006 | Orenstien et al. |
| 7,301,373 | B1 | 11/2007 | Bailey et al. |
| 7,409,568 | B2 | 8/2008 | Tam et al. |
| 7,420,378 | B2 | 9/2008 | Audet et al. |
| 7,454,637 | B2 | 11/2008 | Er et al. |
| 7,464,276 | B2 | 12/2008 | Rusu et al. |
| 7,498,694 | B2 | 3/2009 | Luo et al. |
| 7,673,160 | B2 | 3/2010 | Peterson |
| 7,770,034 | B2 | 8/2010 | Nanja |
| 7,925,899 | B2 | 4/2011 | Gumma et al. |
| 8,010,824 | B2 | 8/2011 | Naffziger |
| 8,060,765 | B1 | 11/2011 | Cha et al. |
| 8,442,786 | B2 | 5/2013 | Naffziger et al. |
| 8,484,593 | B2 | 7/2013 | Lepak et al. |
| 8,650,428 | B2 | 2/2014 | Bajic et al. |
| 8,862,909 | B2 | 10/2014 | Branover et al. |
| 9,052,359 | B2 | 6/2015 | Naffziger et al. |
| 9,092,219 | B2 | 7/2015 | Naffziger et al. |
| 2005/0050495 | A1 | 3/2005 | McGuffin et al. |
| 2008/0098242 | A1 | 4/2008 | Peterson |
| 2008/0122412 | A1 | 5/2008 | Burton et al. |
| 2009/0248217 | A1* | 10/2009 | Verfuerth ............... H05B 47/11 700/295 |
| 2009/0259869 | A1* | 10/2009 | Naffziger ............... G06F 1/324 713/340 |
| 2010/0268974 | A1 | 10/2010 | Floyd et al. |
| 2010/0268975 | A1 | 10/2010 | Bose et al. |
| 2011/0291746 | A1 | 12/2011 | Ibrahim et al. |
| 2011/0301889 | A1 | 12/2011 | Naffziger et al. |
| 2012/0030481 | A1 | 2/2012 | Bose et al. |
| 2012/0109550 | A1 | 5/2012 | Naffziger et al. |
| 2012/0260117 | A1 | 10/2012 | Acar et al. |
| 2014/0223199 | A1* | 8/2014 | Naffziger ............... G06F 1/324 713/300 |
| 2014/0244997 | A1* | 8/2014 | Goel ................... H04W 12/084 713/155 |
| 2014/0330764 | A1 | 11/2014 | Rhines et al. |
| 2017/0257372 | A1* | 9/2017 | Meriac ................... H04L 67/12 |
| 2019/0196573 | A1* | 6/2019 | Gupta ................... G06F 1/3203 |
| 2020/0272371 | A1 | 8/2020 | Suzuki et al. |
| 2020/0328612 | A1* | 10/2020 | Coleman ................ H02J 3/14 |
| 2021/0191494 | A1* | 6/2021 | Rotem ................... G06F 1/324 |

OTHER PUBLICATIONS

Karnik et al., "Scaling trends of Cosmic Rays induced Soft Errors in static latches beyond 0.18u", 2001 Symposium on VLSI Circuits, Digest of Technical Papers, Jun. 14, 2001, pp. 61-62.

Goel et al., "Low-Overhead Design of Soft-Error-Tolerant Scan Flip-Flops with Enhanced-Scan Capability", ASP-DAC 06: Proceedings of the 2006 Asia and South Pacific Design Automation Conference, Jan. 2006, pp. 665-670.

Krishnamohan et al., "A Highly-Efficient Techniques for Reducing Soft Errors in Static CMOS Circuits", Proceedings of the IEEE International Conference on Computer Design: VLSI in Computers and Processors, Nov. 2004, pp. 126-131.

Shimpi, Anand Lal, "AMD Reveals More Llano Details at ISSCC: 32nm, Power Gating, 4-cores, Turbo?", Feb. 8, 2010, 7 pages, http://www.anandtech.com/print/2933. [Retrieved May 18, 2010].

Stokes, Jon "AMD reveals Fusion CPU+GPU, to challege Intel in laptops", Feb. 8, 2010, 2 pages, https://arstechnica.com/information-technology/2010/02/amd-reveals-fusion-cpugpu-to-challege-intel-in-laptops/. [Retrieved May 26, 2010].

International Search Report and Written Opinion in International Application No. PCT/US2021/058840, dated Mar. 4, 2022, 14 pages.

* cited by examiner

APPLICATION OVERRIDE OF POWER ESTIMATION MECHANISM

BACKGROUND

Description of the Related Art

The power consumption of modern integrated circuits (IC's) has become an increasing design issue with each generation of semiconductor chips. IC's often include a power management unit (PMU) for managing the power consumption of various components such as general-purpose processors, graphics processors, other processing units, and other components. The PMU may adjust power-performance states (P-states) using dynamic voltage and frequency scaling (DVFS) techniques based on various factors. Algorithms for the P-state adjustments may assume worst-case thermal conditions. However, during typical usage and environment, the worst-case thermal conditions may not actually apply. Consequently, lower performance states may unnecessarily be selected during these times due to the assumptions in the algorithms. Generally speaking, higher performance results in a higher amount of power consumed. Conversely, limiting the amount of power consumed limits the potential performance of a computer or other type of processor-based electronic system.

For some types of computing systems, the system is programmed to run at a fixed clock frequency for all applications. Since many different types of applications can run on the computing system, the clock frequency is chosen for the worst-case scenario, and then all applications use this worst-case clock frequency. However, the behavior of applications typically varies, and the amount of power consumed by different applications can vary widely while running at the fixed frequency.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for enabling software override of power estimation parameters are disclosed. In one implementation, a computing system undergoes post-silicon characterization to tune various power-estimation parameters. These tuned power-estimation parameters are then hard-coded into the system. A power management unit uses these hard-coded parameters for subsequent power estimation calculations during deployment in a real-world environment. However, to optimize the power budgeting that is performed when distributing portions of a total power budget to different components within the system, the power management unit enables software executing on the system to override the tuned power-estimation parameters on an application-by-application basis. This allows a new application to be profiled on the system to generate an alternate set of tuned power-estimation parameters. This alternate set is loaded into the power management unit when executing the new application. These and other enhanced power-estimation techniques will be described throughout the remainder of the disclosure.

Figure 1:
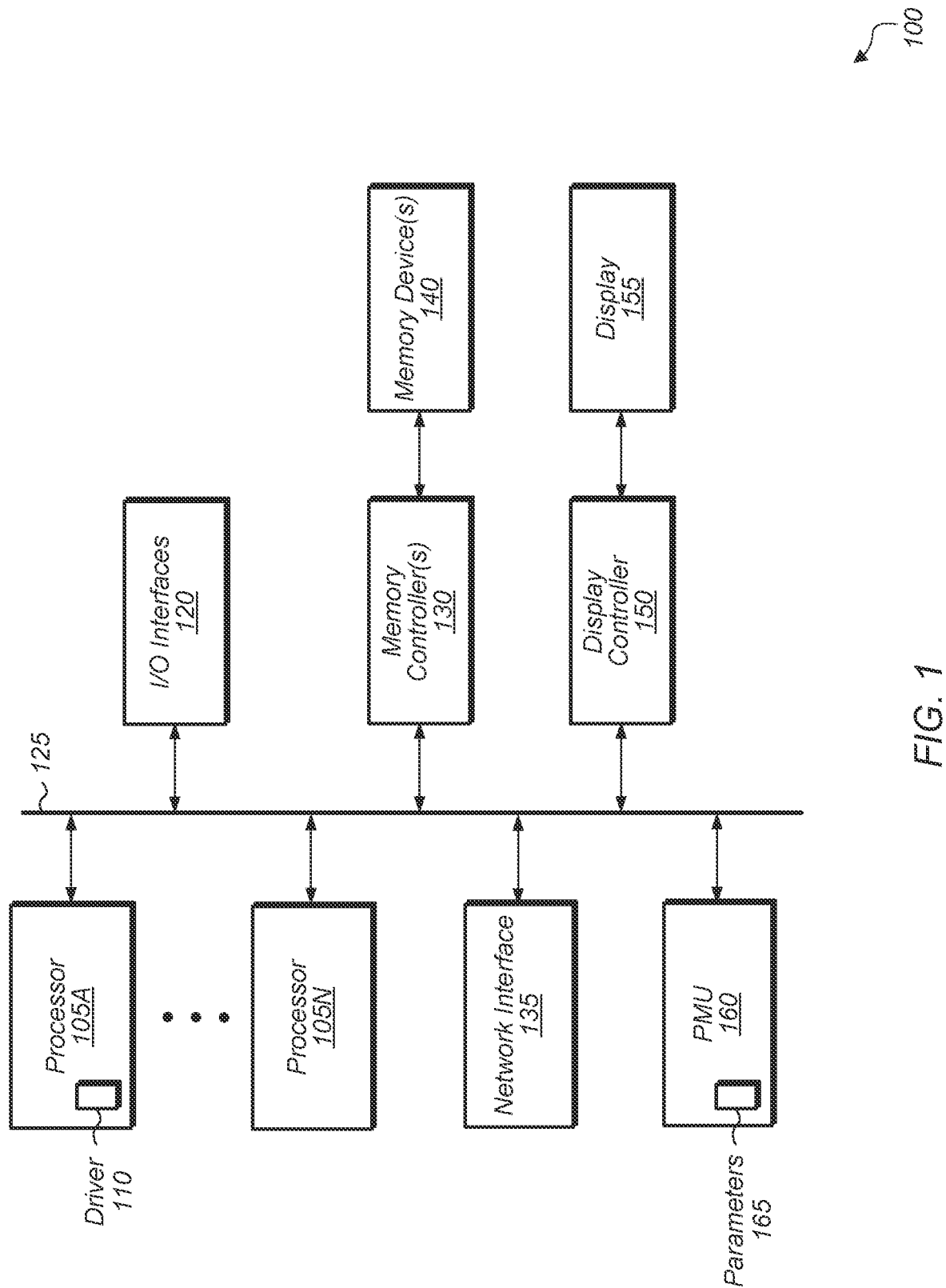
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, display 155, and power management unit (PMU) 160. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. It is noted that depending on the implementation, driver 110 can be implemented using any suitable combination of hardware, software, and/or firmware. In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. While memory controller(s) 130 are shown as being separate from processor 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is able to receive and send network messages across a network.

PMU 160 manages the power consumption of system 100 by adjusting various operating settings (e.g., voltage level, clock frequency) provided to the various functional units of system 100 based on the power consumption and temperature of system 100 during runtime. In one implementation, PMU 160 includes hard-coded parameters 165 which are used for generating estimates of the power consumption of system 100 during deployment. In one implementation, parameters 165 are determined during a profiling phase of system 100. These parameters 165 can include variables such as one or more capacitance coefficients, one or more filter coefficients, one or more error coefficients, one or more error rate coefficients, and other variables associated with the functional units of system 100. In one implementation, PMU 160 allows software executing on processors 105A-N to override parameters 165 on an application-by-application basis. The software can replace the hard-coded parameters 165 with a new set of parameters that are tuned for a new application. This allows the new application to fine-tune the power estimation and power distribution mechanisms of system 100 and potentially achieve a higher performance than would be possible using hard-coded parameters 165. These and other power-estimation parameter override techniques will be described throughout the remainder of this disclosure.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
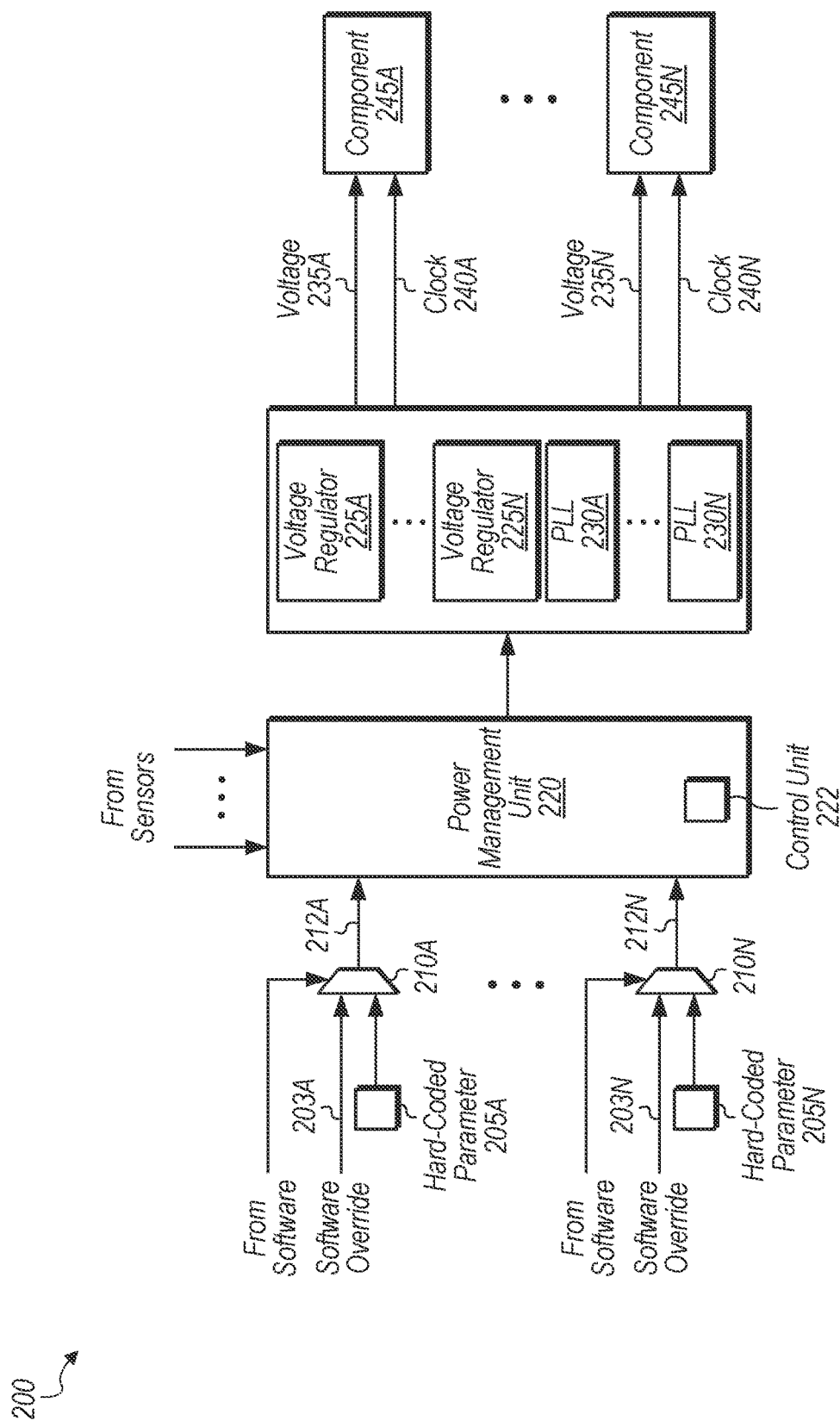
FIG. 2 is a block diagram of one implementation of a system for allowing software to override hardware mechanisms for power management.

Turning now to FIG. 2, a block diagram of one implementation of a system 200 for allowing software to override hardware mechanisms for power management is shown. In one implementation, system 200 includes power management unit 220 for controlling the power consumption and/or power performance state of various components 245A-N. Power management unit 220 can be implemented using any suitable combination of circuitry and/or program instructions. In one implementation, control unit 222 of power management unit 220 adjusts clock frequencies and voltages provided to components 245A-N to ensure that system 200 is operating within specified power, current, and thermal limits. Additionally, in various implementations, control unit 222 of power management unit 220 attempts to maximize the performance of system 200 while meeting the power, current, and thermal limits. Components 245A-N are representative of any number and type of components (e.g., CPU, GPU, memory subsystem, cache subsystem, I/O device).

In one implementation, system 200 is tuned for power management purposes with various hard-coded parameters 205A-N generated based on characteristics of the specific physical components after fabrication. These parameters 205A-N include one or more of first filter alpha value, second filter alpha value, CPU error coefficient, CPU error rate coefficient, GPU error coefficient, GPU error rate coefficient, capacitance coefficient values, and so on. However, rather than using only the previously-tuned parameters 205A-N, system 200 allows software to override one or more of these parameters 205A-N. For example, in one implementation, software sends override values 203A-N which are coupled to multiplexers 210A-N to allow software to override the stored parameters 205A-N on a parameter-by-parameter basis. It should be understood that multiplexers 210A-N are merely meant to illustrate a logical representation of software's ability to override individual parameters 205A-N and are not intended to be an exact representation of the override mechanism.

For example, in another implementation, software writes override values 203A-N to specific locations in memory and then software sends an override request or command (e.g., writes an override value to an override register) to notify power management unit 220 that override mode should be enabled. In response, power management unit 220 uses these override values 203A-N as part of the calculations that are performed to determine how to program the voltage levels of voltages 235A-N and the frequencies of clocks 240A-N. It is noted that other ways of supplying override values from software to power management unit 220 and other techniques for initiating override mode are possible and are contemplated.

In one implementation, the operating system (OS) (or other system software) determines whether to override tuned parameters 205A-N on an application-by-application basis. For example, in one implementation, a first application has a first set of software override values, a second application has a second set of software override values, and so on. This allows each application to fine-tune the performance and power consumption of system 200 based on profiling and analysis of how the application will execute on system 200.

In various implementations, power management unit 220 receives various inputs and/or measurements from sensors. These inputs and/or measurements include temperature measurements, current measurements, and so on. Also, power management unit 220 receives override values 203A-N and/or hard-coded parameters 205A-N via interfaces 212A-N, and power management unit 220 generates an estimate of the real-time power consumption of system 200 based on applying override values 203A-N and/or hard-coded parameters 205A-N to the sensor inputs and measurements. It is noted that interfaces 212A-N can be implemented as a single interface or multiple interfaces depending on the implementation. After generating the power estimate, power management unit 220 uses the power estimate to determine how to adjust the various voltages 235A-N and frequencies of clocks 240A-N that are supplied to components 245A-N.

For example, in one implementation, power management unit 220 receives an indication of a voltage supplied to a given component 245A-N. Power management unit 220 also retrieves a corresponding capacitance coefficient for the given component 245A-N. The capacitance coefficient can be an original hard-coded value or an override value provided by software. Then, in one implementation, power management unit 220 multiplies the capacitance coefficient by the voltage squared multiplied by the clock frequency multiplied by a scaling factor (alpha) (i.e., $C*V^2*F*alpha$). The scaling factor can be an original hard-coded value or an override value provided by software. The result of the multiplication is used as an estimate of the power consumption of the given component 245A-N. Power management unit 220 generates an estimate of power consumption for other components 245A-N in a similar manner and then adds together the estimates to generate an estimate of the power consumption of the entire system 200. It should be understood that this is merely one example of generating a power estimate. One skilled in the art will appreciate that other techniques for generating power estimates can be used in other implementations.

In various implementations, after generating a power estimate for system 200, power management unit 220 compares the power estimate to a total power budget. In one implementation, if the power estimate is greater than the total power budget, power management unit 220 decreases the voltages and/or frequencies supplied to components 245A-N to decrease the power consumption of system 200. In one implementation, the amount that the voltages and/or frequencies are decreased is proportional to the difference between the power estimate and the total power budget. If the power estimate is less than the total power budget, power management unit 220 increases the voltages and/or frequencies supplied to components 245A-N to enable greater performance of system 200. In another implementation, power management unit 220 attempts to keep each component 245A-N within a given component power budget while also keeping the entire system 200 within a total power budget.

Other techniques for distributing power to components 245A-N can be implemented so as to achieve optimal performance. For example, in another implementation, system 200 as a whole has a power budget, and one component 245A-N utilizes all of the remaining power from the power budget rather than being constrained to a specific per-component limit. When performing system-level power calculations, power management unit 220 can use either budgeted or calculated values for the individual components 245A-N. Also, in a further implementation, power management unit 220 allows a software application and/or the OS to control the frequencies and voltages supplied to each component 245A-N. For example, in one implementation, the frequencies and voltages are set by the OS or application based on profiling results. Other ways of distributing power among components 245A-N while keeping system 200 within a specified power budget are possible and are contemplated.

In one implementation, system 200 is a video game console capable of executing any number of different games. Typically, system 200 is characterized after manufacturing and the lower-level parameters and variables (e.g., hard-coded parameters 205A-N) used for power calculations are tuned during this characterization phase. However, this does not take into account the differences in how system 200 consumes power for the different types of games that will be played on system 200. While games can be profiled on system 200 after manufacturing, this is not possible for new games that are developed after system 200 has already been deployed. Accordingly, in order to mitigate these scenarios, system 200 allows lower level variables to be overridden by software on a per-title basis for each different game title. This allows performance to be optimized for each different game that is played on system 200. While video game consoles are described in this example, it should be understood that other types of systems and apparatuses can also benefit from the methods and mechanisms described herein.

Figure 3:
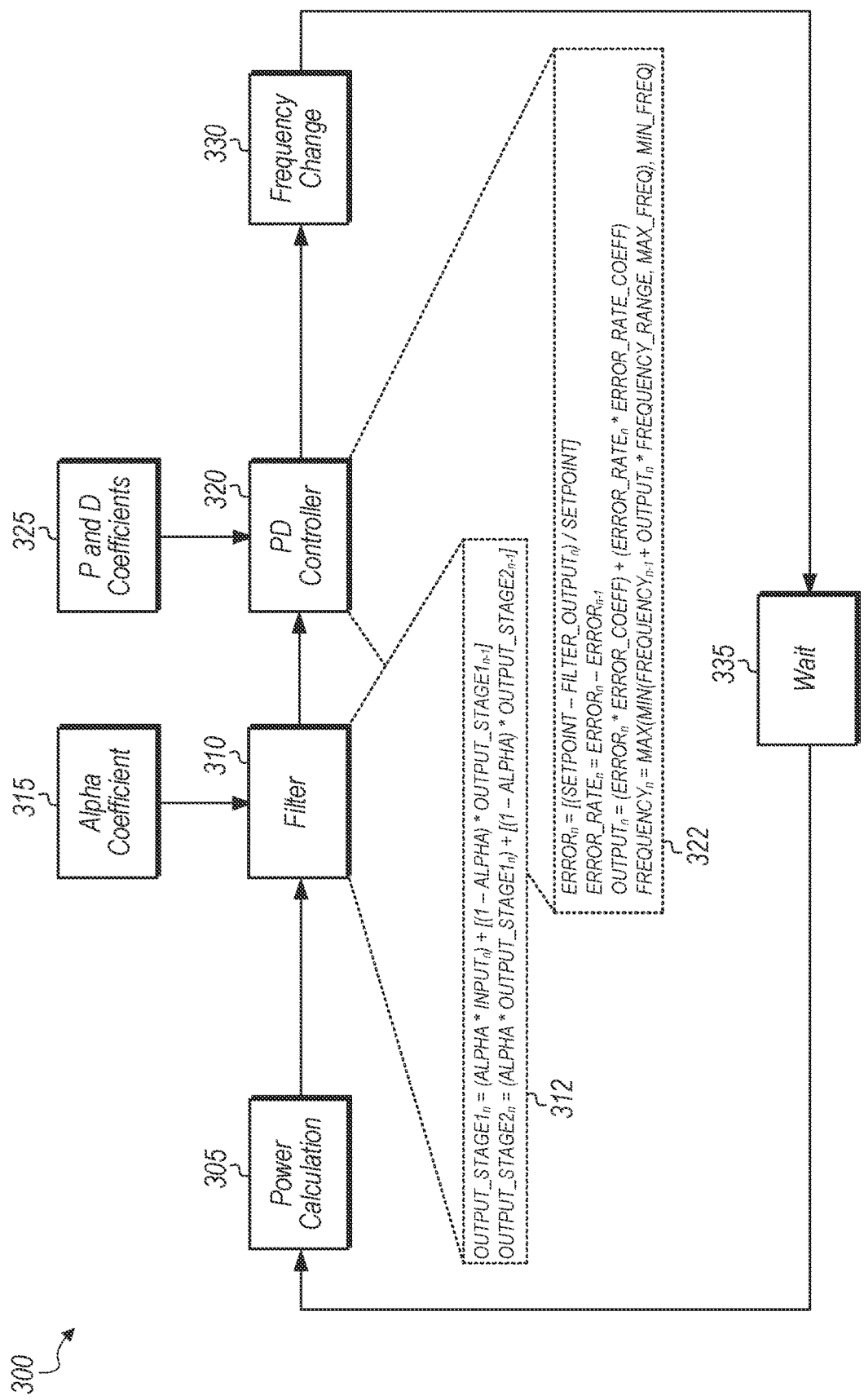
FIG. 3 is a block diagram of one implementation of a power controller algorithm.

Referring now to FIG. 3, a block diagram of one implementation of a power controller algorithm 300 is shown. In one implementation, power controller algorithm 300 is employed by a computing system (e.g., system 100 of FIG. 1, system 200 of FIG. 2) for adjusting the operating conditions of the system's components so as to stay within a power envelope (i.e., a given range of power consumption). In another implementation, power controller algorithm 300 is used for keeping the system within a thermal envelope (i.e., a given temperature range). In a further implementation, power controller algorithm 300 is used for keeping the system within a power envelope and a thermal envelope.

In one implementation, a power calculation 305 is performed to generate an estimate of the power consumption of the computing system. Depending on the application being executed by the computing system, power calculation 305 can use a predetermined set of parameter values or power calculation 305 can use a targeted set of parameter values that are tailored to a specific application. In one implementation, power calculation 305 is performed with a set of parameters which override the system's loaded set of parameter values that were previously determined during post-silicon characterization. An example of a power calculation 305 is the previously presented power equation (power=$C*V^2*F*alpha$). However, other types of power equations can be used in other implementations.

After power calculation 305 is performed to generate a power estimate, this power estimate is provided as an input to filter 310. In one implementation, filter 310 is a two stage alpha filter with an infinity impulse response filter with one coefficient (e.g., alpha coefficient 315) which defines the time constant. It is noted that alpha coefficient 315 is a different variable from the alpha variable used in the power equation. The two stage filter can be implemented as two alpha filters in series. An example of a filter 310 in accordance with one implementation is shown in the equations in dashed box 312 below filter 310. In this implementation, filter 310 has two output stages ($OUTPUT\_STAGE1_n$ and $OUTPUT\_STAGE2_n$) which are calculated based on the values (ALPHA) and (1-ALPHA). It should be understood that the equations in dashed box 312 are merely representative of one way to implement filter 310. It is noted that in other embodiments, other types of filter equations can be used when implementing filter 310.

The output of filter 310 (i.e., FILTER OUTPUT, in dashed box 322) is provided to proportional-derivative (PD) controller 320. In one implementation, PD controller 320 uses a proportional-derivative control loop mechanism based on the P and D coefficients 325 but with the integral coefficient set to 0 to adjust the frequency target of the clock being controlled. It is noted that P and D coefficients 325 can also be referred to as error and error rate coefficients, respectively. One example of an implementation of a proportional-derivative control loop mechanism is shown in the equations of dashed box 322. In other implementations, PD controller 320 can use other types of control loop mechanisms other than those based on proportional-derivative control.

As shown in the equations of dashed box 322, the error term is calculated as a percentage error and not an absolute error. In the equations of dashed box 322, the error coefficient is referred to as "ERROR_COEFF" and the error rate coefficient is referred to as "ERROR_RATE_COEFF". The output of proportional-derivative controller 320 is provided to frequency change block 330 for changing the frequency target of the clock being controlled. In one implementation, once the output of PD controller 320 is calculated, this output is added to the frequency target for the given controller's previous frequency target. The final frequency target is then limited to being within the maximum frequency and minimum frequency for that clock. After initiating a frequency change for a given component, the power management unit waits some amount of time (e.g., 1 millisecond (ms)) as indicated by wait block 335 before starting over again and making a new power calculation 305.

Figure 4:
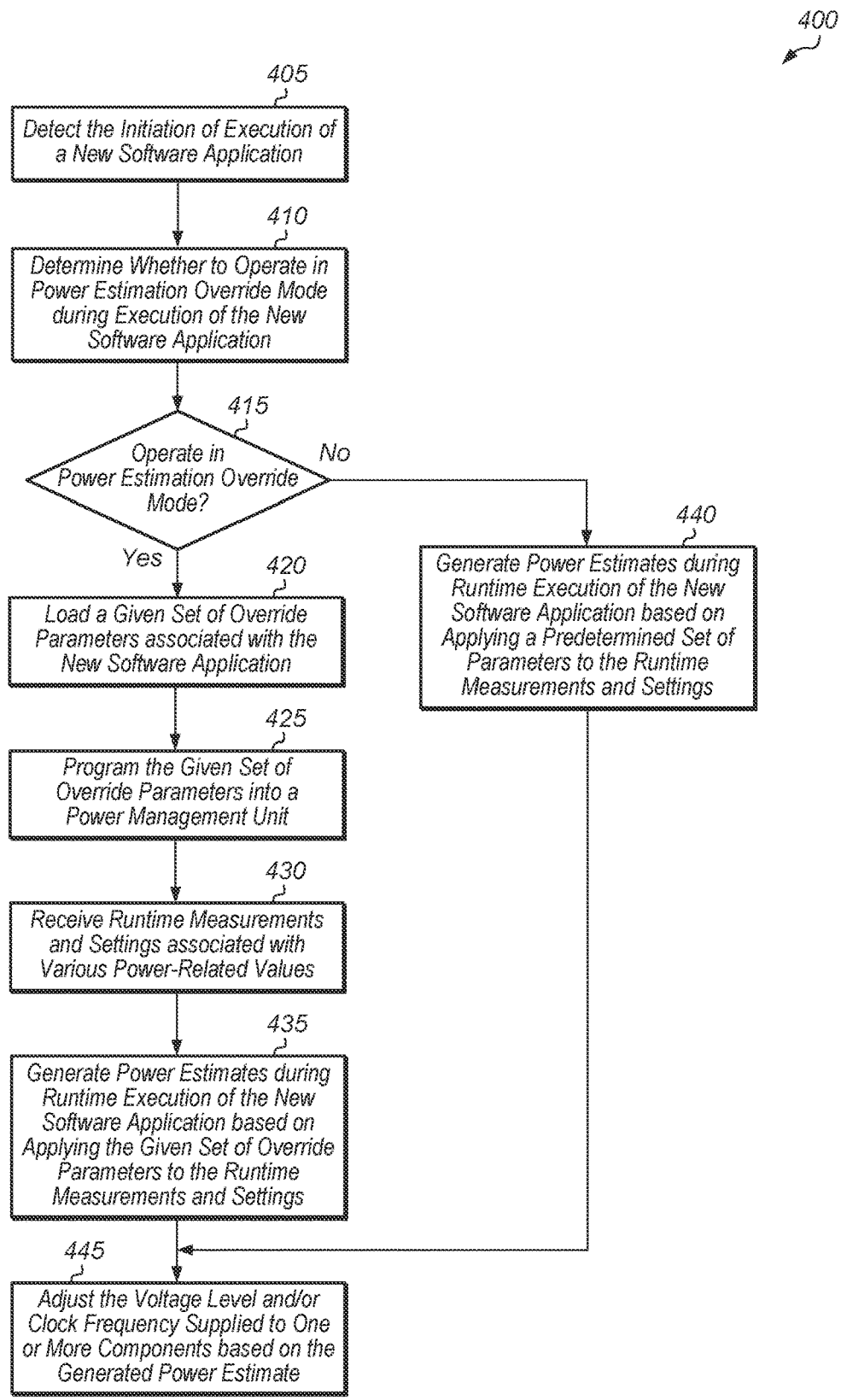
FIG. 4 is a generalized flow diagram illustrating one implementation of a method for enabling application override of a power estimation mechanism.

Turning now to FIG. 4, one implementation of a method 400 for enabling application override of a power estimation mechanism is shown. For purposes of discussion, the steps in this implementation and those of FIG. 5-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 400.

A computing system detects the initiation of execution of a new software application (block 405). In response to detecting the new software application being initiated, the computing system determines whether to operate in power estimation override mode during execution of the new software application (block 410). In one implementation, the new software application includes an indication or setting which specifies whether to use power estimation override mode during execution of the new software application. In other implementations, other ways of determining whether to implement power estimation override mode can be used.

If the computing system decides to operate in power estimation override mode (conditional block 415, "yes" leg), then the computing system loads a given set of override parameters associated with the new software application (block 420). Next, the computing system programs the given set of override parameters into a power management unit (block 425). During execution of the new software application, the power management unit receives runtime measurements and settings associated with various power-related values (block 430). For example, these measurements can include, but are not limited to, temperature measurements, current measurements, voltage levels, frequency settings, and other measurements and settings. Then, the power management unit generates power estimates during runtime execution of the new application based on applying the given set of override parameters to the runtime measurements and settings (block 435). Next, the power management unit adjusts the voltage level and/or clock frequency supplied to one or more components based on the generated power estimate (block 445). In one implementation, the power management unit adjusts the voltage level and/or clock frequency supplied to one or more components based on the generated power estimate so as to meet a given power target. After block 445, method 400 ends.

Otherwise, if the computing system determines to operate in standard power estimation mode (conditional block 415, "no" leg), then the power management unit generates power estimates during runtime execution of the new application based on applying a predetermined set of parameters to the runtime measurements and settings (block 440). After block 440, the power management unit adjusts the voltage level and/or clock frequency supplied to one or more components based on the generated power estimate (block 445).

Figure 5:
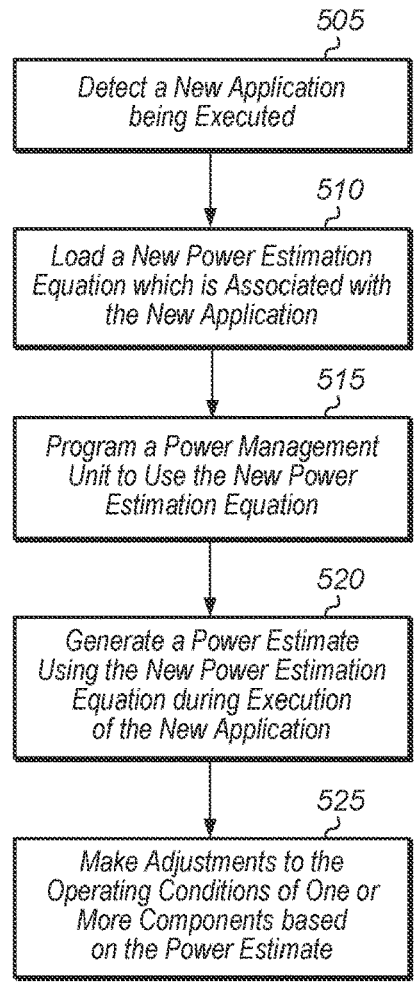
FIG. 5 is a generalized flow diagram illustrating one implementation of a method for loading a new power estimation equation.

Referring now to FIG. 5, one implementation of a method 500 for loading a new power estimation equation is shown. A computing system detects a new application being executed (block 505). Next, the computing system loads a new power estimation equation which is associated with the new application (block 510). It is noted that the new power estimation equation can be generated during a profiling phase while the new application is being run on a test computing system which resembles or matches the current computing system. Software (e.g., an OS) running on the system programs a power management unit to use the new power estimation equation (block 515). It is noted that the power management unit includes an existing power estimation equation which will be replaced (i.e., preempted) by the new power estimation equation, with the new power estimation equation being different from the existing power estimation equation. It is noted that the existing power estimation equation can be referred to as a "first power estimation equation" and the new power estimation equation can be referred to as a "second power estimation equation". Alternatively, the power management unit can retain the existing power estimation equation, and applications can select to use either the existing or new power estimation equation. In other implementations, the power management unit maintains three or more separate power estimation equations, with any equation able to be selected by a given application.

Next, during execution of the new application, the power management unit generates a power estimate using the new power estimation equation (block 520). The power management unit makes adjustments to the operating conditions (e.g., voltage level, clock frequency) of one or more components based on the power estimate (block 525). After block 525, method 500 ends. It is noted that if the computing system executes a different application at a later point in time, the computing system can revert back to the previous power estimation equation or load another new power estimation equation specific to this other application. In some cases, each application is capable of having its own finely-tuned power estimation equation that tracks the unique profile of the application. It is also noted that blocks 520 and 525 can be repeated any number of times during execution of the new application to generate multiple power estimates and make corresponding adjustments.

Figure 6:
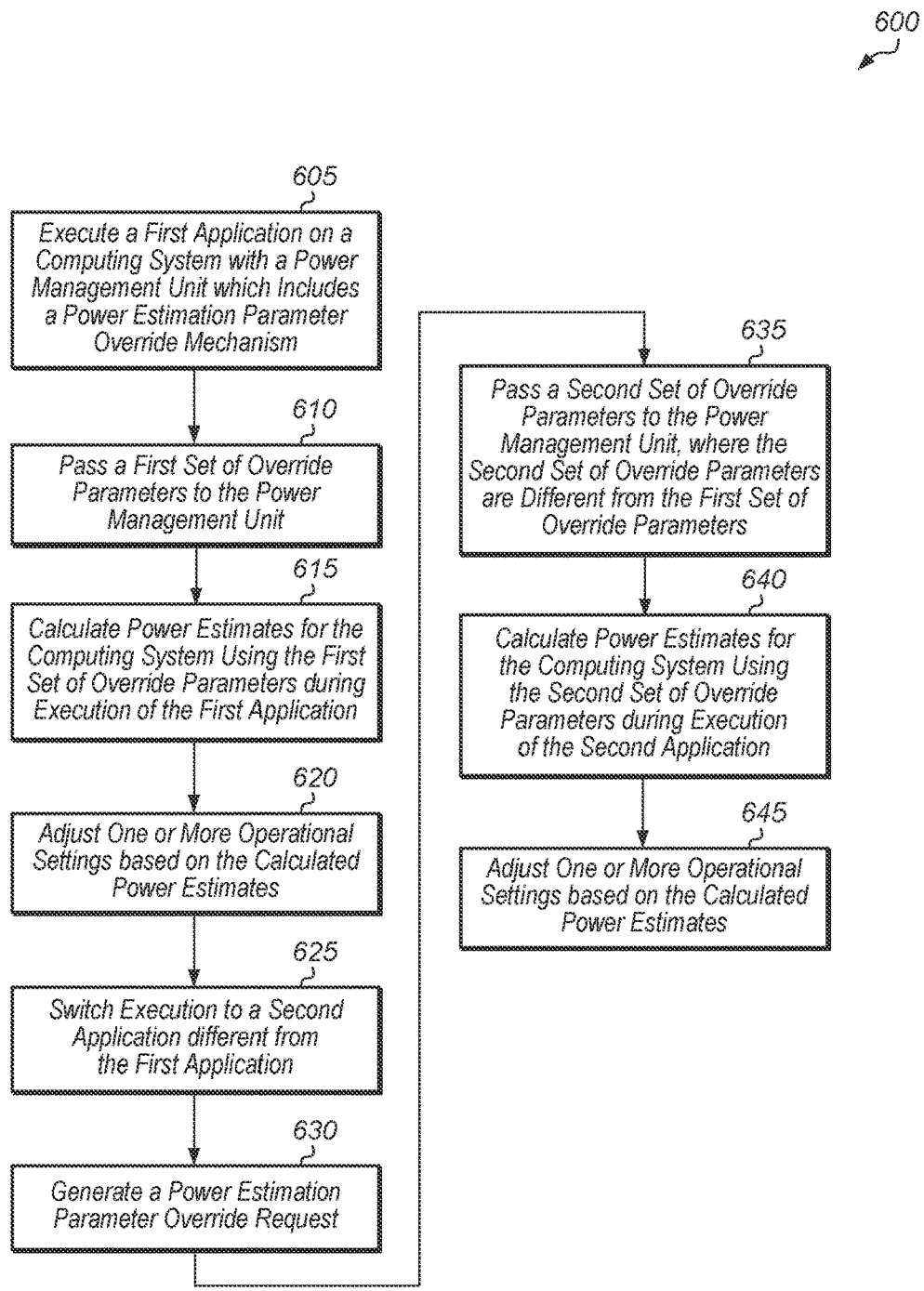
FIG. 6 is a generalized flow diagram illustrating one implementation of a method for using a per-application set of override parameters.

Turning now to FIG. 6, one implementation of a method 600 for using a per-application set of override parameters is shown. A processor executes a first application on a computing system with a power management unit which includes a power estimation parameter override mechanism (block 605). Prior to or while executing the first application, the processor passes a first set of override parameters to the power management unit (block 610). The power management unit calculates power estimates for the computing system using the first set of override parameters during execution of the first application (block 615). Next, the power management unit adjusts one or more operational settings (e.g., per-component supply voltage magnitude, per-component clock frequency) based on the calculated power estimates (block 620). At a later point in time, the processor switches execution to a second application different from the first application (block 625).

Prior to or during execution the second application, the processor generates a power-estimation parameter override request which is conveyed to the power management unit (block 630). Also, the processor passes a second set of override parameters to the power management unit, where the second set of override parameters are different from the first set of override parameters (block 635). In one implementation, the second set of override parameters are specified and/or provided by the second application. In response to detecting the power-estimation parameter override request, the power management unit calculates power estimates for the computing system using the second set of override parameters during execution of the second application (block 640). Then, the power management unit adjusts one or more operational settings based on the calculated power estimates (block 645). After block 645, method 600 ends. It is noted that method 600 can be executed for any number of other applications, with each application having its own set of override parameters. It is also noted that in one implementation, the first and second applications represent first and second games that are executing on a game console. In other implementations, the first and second applications can be other types of software applications executing on other types of computing systems.

Figure 7:
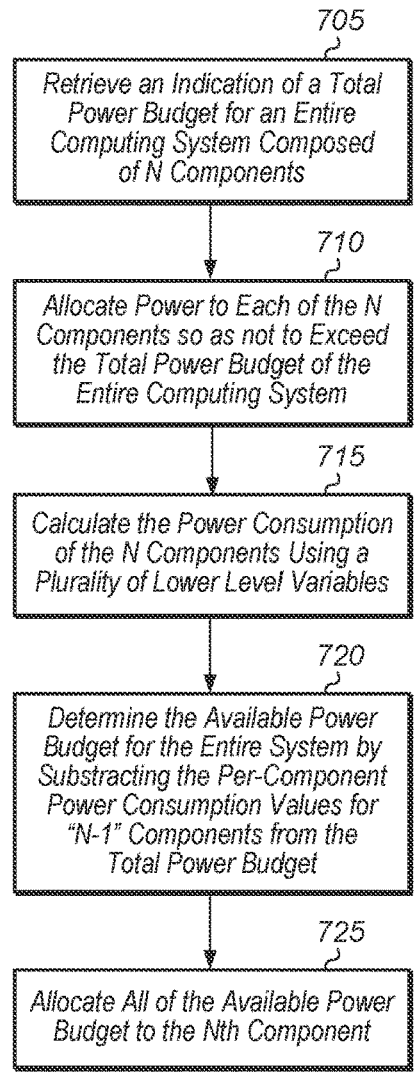
FIG. 7 is a generalized flow diagram illustrating one implementation of a method for allocating power budgets to components of a computing system.

Referring now to FIG. 7, one implementation of a method 700 for allocating power budgets to components of a computing system is shown. A power management unit retrieves an indication of a total power budget for an entire computing system composed of N components (block 705). The number of "N" components can vary from system to system, with N being a positive integer greater than one. The power management unit allocates power to each of the N components so as not to exceed the total power budget of the entire computing system (block 710). During runtime, the power management unit calculates the power consumption of the N components using a plurality of lower level variables (block 715). The plurality of lower level variables can include tuned variables determined during post-silicon characterization as well as override variables provided by an OS or software application.

Next, the power management unit determines the available power budget for the entire system by subtracting the per-component power consumption values for "N−1" components from the total power budget (block 720). Then, the power management unit allocates all of the available power budget to the Nth component (block 725). The Nth component of method 700 can be any type of component, with the type varying from implementation to implementation. For example, in one implementation, the Nth component is a GPU. In other implementations, the Nth component can be any of various other types of components. After block 725, method 700 ends. It is noted that method 700 can be repeated on a periodic basis to update the power budget which is allocated to the Nth component.

Figure 8:
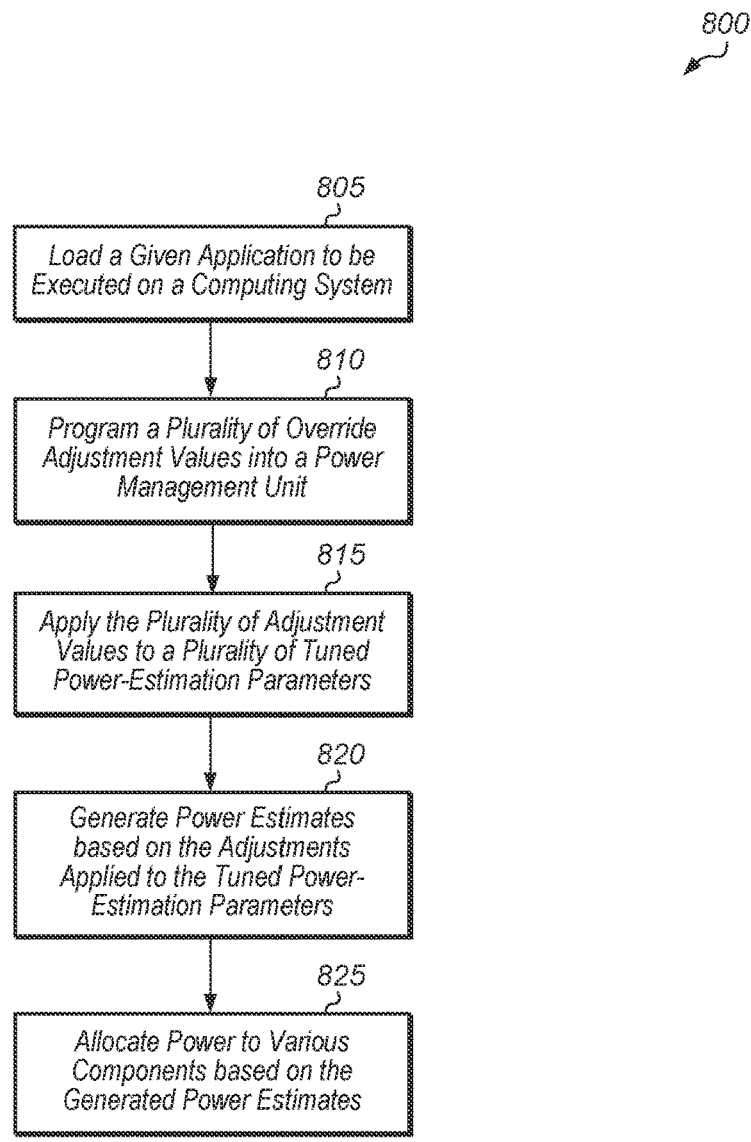
FIG. 8 is a generalized flow diagram illustrating one implementation of a method for applying adjustments to tuned power-estimation parameters.

Turning now to FIG. 8, one implementation of a method 800 for applying adjustments to tuned power-estimation parameters is shown. A computing system loads a given application to be executed on the system (block 805). As part of loading the given application, the computing system programs a plurality of override adjustment values into a power management unit (block 810). The power management unit applies the plurality of adjustment values to a plurality of tuned power-estimation parameters (block 815). For example, if there are 12 different tuned parameters, software can specify 12 adjustment values to apply to these 12 tuned parameters. In some cases, software can specify adjustment values for a subset of the tuned parameters rather than changing all of the tuned parameters. Each adjustment value can be a percentage in one implementation, such that a $1^{st}$ adjustment value is 120%, a $2^{nd}$ adjustment value is 90%, and so on. In this example, the adjustment values are multiplied by the tuned parameter values to generate adjusted parameter values.

Next, during execution of the given application, the power management unit generates power estimates based on the adjustments applied to the tuned power-estimation parameters (block 820). Then, the power management unit allocates power to various components based on the generated power estimates (block 825). After block 825, method 800 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A computing system comprising:
one or more functional circuits;
a power management circuit configured to:
replace an existing set of power-estimation parameters with a first set of override power-estimation parameters associated with a first application, in response to initiating execution of the first application;
generate a first estimate of power consumption by the one or more functional circuits during runtime based on runtime measurements and the first set of override power-estimation parameters while the computing system executes the first application; and
adjust one or more power-related settings for the one or more functional circuits based on the first estimate of power consumption.

2. The computing system as recited in claim 1, wherein the existing set of power-estimation parameters are default power-estimation parameters generated during a pre-deployment characterization phase, and wherein the one or more power-related settings comprise at least one of a supply voltage magnitude and a clock frequency.

3. The computing system as recited in claim 1, wherein in response to detecting execution of a second application, the power management circuit is further configured to:
   replace the first set of override power-estimation parameters with a second set of override power-estimation parameters which are associated with the second application, in response to execution of the second application;
   generate a second estimate of power consumption by the one or more functional circuits based on the second set of override power-estimation parameters while the computing system executes the second application; and
   adjust one or more power-related settings for the one or more functional circuits based on the second estimate of power consumption.

4. The computing system as recited in claim 1, wherein the first set of override power-estimation parameters comprise one or more of: capacitance coefficients, one or more filter coefficients, an error coefficient, and an error rate coefficient for the one or more functional circuits.

5. The computing system as recited in claim 1, wherein the one or more functional circuits comprise a central processing unit (CPU) and a graphics processing unit (GPU).

6. The computing system as recited in claim 2, wherein the first application is configured to enable override of the default power-estimation parameters by indicating an override mode of operation.

7. The computing system as recited in claim 6, wherein in a non-override mode of operation, the existing set of power-estimation parameters are not replaced with the first set of override power-estimation parameters.

8. A method comprising:
   replacing an existing set of power-estimation parameters with a first set of override power-estimation parameters associated with a first application, in response to initiating execution of the first application;
   generating, by a power management circuit, a first estimate of power consumption by one or more functional circuits during runtime based on runtime measurements and the first set of override power-estimation parameters while a computing system executes the first application; and
   adjusting one or more power-related settings for the one or more functional circuits based on the first estimate of power consumption.

9. The method as recited in claim 8, wherein the existing set of power-estimation parameters are default power-estimation parameters generated during a pre-deployment characterization phase, and wherein the one or more power-related settings comprise at least one of a supply voltage magnitude and a clock frequency.

10. The method as recited in claim 8, wherein in response to detecting execution of a second application the method comprises:
   replacing the first set of override power-estimation parameters with a second set of override power-estimation parameters which are associated with the second application, in response to execution of the second application;
   generating a second estimate of power consumption by the one or more functional circuits based on the second set of override power-estimation parameters while the computing system executes the second application; and
   adjusting one or more power-related settings for the one or more functional circuits based on the second estimate of power consumption.

11. The method as recited in claim 8, wherein the first set of override power-estimation parameters comprise one or more of: capacitance coefficients, one or more filter coefficients, an error coefficient, and an error rate coefficient for the one or more functional circuits.

12. The method as recited in claim 8, wherein the one or more functional circuits comprise a central processing unit (CPU) and a graphics processing unit (GPU).

13. The method as recited in claim 9, further comprising the first application enabling override of the default power-estimation parameters by indicating an override mode of operation.

14. The method as recited in claim 13, the first application is configured to indicate the override mode of operation by performing a write to a register.

15. An apparatus comprising:
   a control circuit configured to:
      replace an existing set of power-estimation parameters with a first set of override power-estimation parameters associated with a first application, in response to initiating runtime execution of the first application;
      generate a first estimate of power consumption by one or more functional circuits of a computing system during runtime based on runtime measurements and the first set of override power- estimation parameters while the computing system executes the first application; and
      cause adjustments to be made to one or more power-related settings for the one or more functional circuits based on the first estimate of power consumption.

16. The apparatus as recited in claim 15, wherein the existing set of power-estimation parameters are default power-estimation parameters generated during a pre-deployment.

17. The apparatus as recited in claim 15, wherein the control circuit is further configured to:
   replace the first set of override power-estimation parameters with a second set of override power-estimation parameters which are associated with a second application, in response to execution of the second application;
   generate a second estimate of power consumption by the one or more functional circuits based on the second set of override power-estimation parameters while the computing system executes the second application; and
   adjust one or more power-related settings for the one or more functional circuits based on the second estimate of power consumption.

18. The apparatus as recited in claim 15, wherein the first set of override power-estimation parameters comprise one or more of: capacitance coefficients, one or more filter coefficients, an error coefficient, and an error rate coefficient for the one or more functional circuits.

19. The apparatus as recited in claim 15, wherein the control circuit is configured to replace the existing set of power-estimation parameters with the first set of override power-estimation parameters, in further response to an override mode indication generated by the first application.

20. The apparatus as recited in claim 17, wherein the first estimate of power consumption causes a first allocation of power to each of the one or more functional circuits, and the second estimate of power consumption causes a reallocation of power from at least one of the one or more functional circuits to a different functional unit.

\* \* \* \* \*